Oct. 23, 1945.  W. D. HEDGES ET AL  2,387,393
PROCESS OF MANUFACTURE OF PLASTICIZER OR SOFTENING AGENT
Filed Jan. 19, 1940
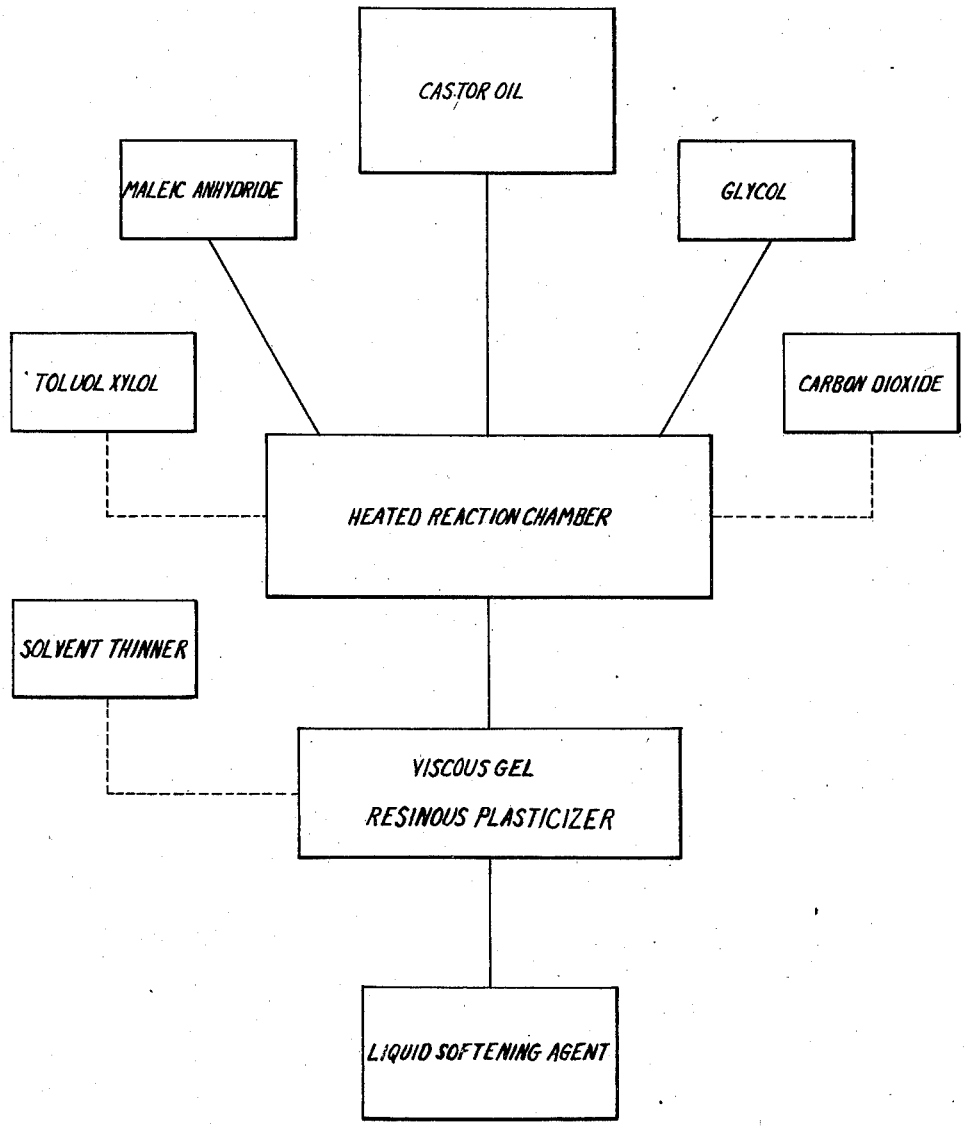
Inventors
William D. Hedges
John C. Lowman
Thomas J. Kerr
By
Attorneys Patented Oct. 23, 1945

2,387,393

UNITED STATES PATENT OFFICE 2,387,393

PROCESS OF MANUFACTURE OF PLASTICIZER OR SOFTENING AGENT

William D. Hedges, John C. Lowman, and Thomas J. Kerr, Columbus, Ohio, assignors to Columbus Coated Fabrics Corporation, Columbus, Ohio, a corporation of Ohio Application January 19, 1940, Serial No. 314,682

2 Claims. (Cl. 260—22)

This invention relates to a process of making a plasticizer or softening agent from hydroxy fatty acid oils.

It is an object of this invention to produce an improved softening agent from castor oil which is particularly useful in compounding nitrocellulose coating compositions and similar cellulose ester products.

Another object is to make an improved softening agent which is compatible with the conventional lacquer solvents and which will have a higher exudation temperature point than the softening agents heretofore used for compounding coating compositions.

Another object of this invention is to produce a softening or plasticizing agent from castor oil which can be incorporated in coating compositions to produce a film having a high degree of flexibility which will be retained upon aging.

Another object of this invention is to produce a softening agent by modifying castor oil or equivalent hydroxy fatty acid oils so as to produce a plasticizer having a low acid number and of light color.

Plasticizers have been suggested for nitrocellulose compositions heretofore which are made by special heat treatment of castor oil with polybasic acids to form esters of the reactable hydroxyl groups of the oil. While these compounds have advantages over the use of raw castor oil as a plasticizer for pyroxylin coating compositions, they do not produce films having as high a degree of flexibility as similar coating films formulated utilizing the resinous plasticizers described hereinafter.

Castor oil is soluble in ethyl alcohol which is a common solvent utilized in compounding nitrocellulose and similar cellulose ester compositions. This property is accounted for due to the presence of hydroxyl groups in the ricinoleic acid component of the oil. As these hydroxyl groups are removed the solubility in alcohol decreases. The esterification of castor oil with polybasic acids and further heat treatment of this mixture tend to dehydrate the ricinoleic acid component of the oil. As the dehydration increases the solubility of the oil correspondingly decreases in alcohol and the resulting dehydrated oil loses some of its advantages as a plasticizer for nitrocellulose and pyroxylin type compositions.

In the present invention it has been discovered that by reacting castor oil with dihydric alcohol and dibasic acid a modified castor oil product is produced having increased solubility in cellulose and synthetic resinous compositions. The temperature of the heat treatment and the final viscosity of the product are substantially the same as in the case of treating castor oil with polybasic acids as heretofore mentioned.

Referring to the drawing, there is illustrated diagrammatically the principal steps involved in making the improved plasticizer of this invention. There is shown in dotted line the alternative addition agents which may be made during the process.

The following examples illustrate a typical method of producing the softening agent of this invention:

Example I

A mixture of 150 parts by weight of castor oil, 31 parts by weight of glycol and 50 parts by weight of maleic anhydride is heated together in a reaction chamber, with or without stirring or blowing with $CO_2$, at a temperature of approximately 230 degrees C. for 12 hours. The reaction chamber is preferably equipped with a stirrer, and provision is made for escape of the water formed during the reaction, while at the same time loss of glycol is prevented. When the product is heat treated for this length of time the product is in the form of a gel. If it is desired to carry the resin to this state it is preferable to add a solvent such as toluol or xylol thereto while the resin is still hot. This prevents the resin from going into an insoluble state before it is used, and also provides a product which is readily dispersed in coating compositions. If $CO_2$ is used the alcohol compatibility of the resin is somewhat decreased and the cooking time is shortened. Carbon dioxide may be introduced by bubbling the gas through the mixture. With the use of carbon dioxide a lower acid value resin is produced.

Example II

In this example, 400 parts by weight of castor oil, 26 parts by weight of diethylene glycol and 50 parts by weight of maleic anhydride are mixed together and heated as described under Example I. Using the same temperature in cooking, the time is reduced from 12 to 8 hours. The acid number and alcohol solubility of the final resinous product are affected by the same factors as are noted under Example I. In this case the final product has an acid number of about 9 without the use of $CO_2$. By heat treating the resin for longer than 8 hours at a temperature between 200 and 250 degrees C. the final resinous product will be in the form of a difficultly soluble gel.

Example III

In this example, 800 parts by weight of castor oil, 50 parts by weight of maleic anhydride and 26 parts by weight of glycol, preferably diethylene glycol, are mixed together and heated, as set out above in Example I. In this instance the cooking time is about 14 hours at 230 degrees C. The resinous product produced has an acid number of about 9. A longer cooking time will produce a substantially insoluble resin. Where the resin is to be cooked to produce a product having a high viscosity it is preferable to add toluol or xylol in sufficient amount while the resin is hot so as to prevent the product from going over into an insoluble state upon cooling. The resins made as described will continue to polymerize at temperatures below 200 degrees C. and even below 100 degrees C. so that the introduction of solvent to prevent the polymerization from continuing so as to to produce an insoluble solid gel is required.

Example IV

In this instance, 1000 to 1200 parts by weight of castor oil are mixed with 26 parts by weight of diethylene glycol and 50 parts by weight of maleic anhydride and the mixture heat treated as in the previous example. The time required for cooking this batch is much longer than that for the previous example. It was found impossible to produce a gel from this combination even after cooking the resinous batch for 27 hours at 275 degrees C. The product, however, results in yielding a bodied oily resin having definite advantages as a plasticizer over raw castor oil.

It will be understood that this invention is not limited to the ingredients and particular proportion set out in the above examples and that equivalent compounds may be employed in making the plasticizing resin. The general proportionate range by weight of ingredients, as illustrated in the examples, may comprise approximately 65 to 94 per cent castor oil, 4 to 13 per cent diethylene glycol and 2 to 22 per cent maleic anhydride. Any oil comprising hydroxyl groups in its formula, which is capable of becoming dehydrated and which after such dehydration is converted into a drying oil, may be substituted for castor oil. Further, suitable portions of castor oil may be replaced with any one or more of the non-drying or semi-drying oils. Glycols having the general formula $C_nH_{2n}(OH)_2$ may be used in making the resin. Triethylene, propylene and higher glycols may be used in place of ethylene and diethylene glycol. Some glycols offer definite advantages over others, in certain cases, as for example when diethylene glycol is substituted for ethylene glycol, the cooking time of the resin is decreased. This invention, however, is applicable to the use of various polyhydric alcohols including glycerin which react similarly as the glycols to produce the plasticizing resin.

In the examples maleic anhydride is the polybasic acid preferably used, but other unsaturated acids such as fumaric, or monobasic acids, i. e., acrylic, crotonic and the like may be utilized in place of maleic. In general, all unsaturated carboxylic acids of the aromatic, aliphatic or heterocyclic series may be employed. It is to be understood that the acids referred to in the claims include either the acid or the anhydride thereof. Resinous plasticizers for nitrocellulose can also be prepared by the substitution of other dibasic acids such as phthalic acid for the maleic anhydride in the examples given, but such resins are somewhat inferior as plasticizers for nitrocellulose, particularly when used as a coating for fabrics.

In the examples given, all the ingredients are added at the same time; however, it is possible to produce satisfactory plasticizing resins if the polyhydric alcohol and the oil are first heated until an equilibrium is established. Thereafter the dibasic acid may be added and the mixture cooked to produce a plasticizing resin of the desired viscosity. The higher viscosity plasticizing resins show less tendency to spew than the lower polymerized plasticizers. All the plasticizing resins produced have a light yellow color and are accordingly well adapted for use with white pigments. The plasticizer formulated using 800 parts castor oil, as set out in Example III, has a viscosity of approximately 450 centipoises, whereas using 1000 parts castor oil, as in Example IV, the viscosity is approximately 60.

Coating films comprising the plasticizing resin of this invention are able to withstand temperatures of from 90 to 120 degrees C. before any appreciable softening or exudation of the plasticizer or softening resin occurs. This is a decided improvement over the use of castor oil as a softener in similar compositions which soften and exude the castor oil at temperatures between 70 to 75 degrees C. Moreover coating compositions comprising the plasticizing resin herein described display much greater toughness and flexibility than castor oil plasticized films. Further the high degree of flexibility is retained for a much longer period of time than when the conventional plasticizers are utilized.

It is understood that this invention is not limited to the examples given and that widely different embodiments of this invention may be made without departing from the spirit and scope thereof.

Our copending application, Serial No. 314,681, relates to plasticizing resin such as results from the practice of the process herein described.

Having thus fully described our invention, what we claim as new and desire to secure by Letters Patent is:

1. The method of making a modified castor oil product adapted for use as a softener in coating compositions, comprising heat reacting a mixture consisting of substantially 800 parts by weight of castor oil, substantially 50 parts by weight of maleic anhydride, and substantially 26 parts by weight of diethylene glycol for a period of about 14 hours at substantially 230° C. to produce a resinous product having an acid number of about 9.

2. As a new article of manufacture, the product of the process of claim 1.

WILLIAM D. HEDGES.
JOHN C. LOWMAN.
THOMAS J. KERR.